United States Patent [19]
Dal Palu'

[11] Patent Number: 5,295,719
[45] Date of Patent: Mar. 22, 1994

[54] CONNECTION ASSEMBLY FOR VEHICLE ENGINE COOLANT CIRCUITS

[75] Inventor: Attilio Dal Palu', Rivoli, Italy

[73] Assignee: Fabbrica Italiana Serrature Torino S.p.A., Turin, Italy

[21] Appl. No.: 911,880

[22] Filed: Jul. 10, 1992

Related U.S. Application Data

[63] Continuation of Ser. No. 712,149, Jun. 6, 1991.

[30] Foreign Application Priority Data

Jun. 8, 1990 [IT] Italy .................. 53078/90[U]

[51] Int. Cl.⁵ .................................. F16L 13/00
[52] U.S. Cl. .............................. 285/292; 285/903
[58] Field of Search .................. 285/156, 292, 423

[56] References Cited

U.S. PATENT DOCUMENTS

| | | | |
|---|---|---|---|
| 3,724,489 | 4/1973 | Eross | 285/156 X |
| 3,781,041 | 12/1973 | Petzetakis | 285/156 X |
| 3,820,826 | 6/1974 | Ligow et al. | 285/156 X |
| 3,924,881 | 12/1975 | O'Connor | 285/156 |
| 3,984,133 | 10/1976 | Bird | 285/156 X |
| 4,099,744 | 7/1978 | Kutnyak et al. | 285/903 X |
| 4,238,131 | 12/1980 | Cleveland | 285/156 X |
| 4,369,992 | 1/1983 | Fournier et al. | 285/903 X |
| 4,596,410 | 6/1986 | Hughes et al. | 285/903 X |
| 4,625,998 | 12/1986 | Draudt et al. | 285/903 X |
| 4,810,008 | 3/1989 | Brodie | 285/156 X |
| 4,819,970 | 4/1989 | Umehara | 285/903 X |
| 4,848,801 | 7/1989 | Grabowski | 285/156 X |
| 4,909,547 | 3/1990 | Guy | 285/903 X |
| 4,919,462 | 4/1990 | Matsui | 285/156 X |
| 4,997,213 | 3/1991 | Toney et al. | 285/423 X |
| 4,998,337 | 3/1991 | Tiekink | 285/292 X |
| 5,033,775 | 7/1991 | Matte et al. | 285/156 X |
| 5,039,134 | 8/1991 | Meadows et al. | 285/156 X |
| 5,058,934 | 10/1991 | Brannon | 285/292 X |

Primary Examiner—Dave W. Arola
Attorney, Agent, or Firm—Gifford, Groh, Sprinkle, Patmore and Anderson

[57] ABSTRACT

A connection assembly for vehicle engine coolant circuits, wherein a tubular multiway distributing element presents respective tubular appendixes fitted with the end portion of a branch pipe. The pipe and tubular appendix are made integral by means of a tubular coupling molded in one piece on the end portion of the pipe, on a relatively small portion connecting with the appendix.

4 Claims, 1 Drawing Sheet

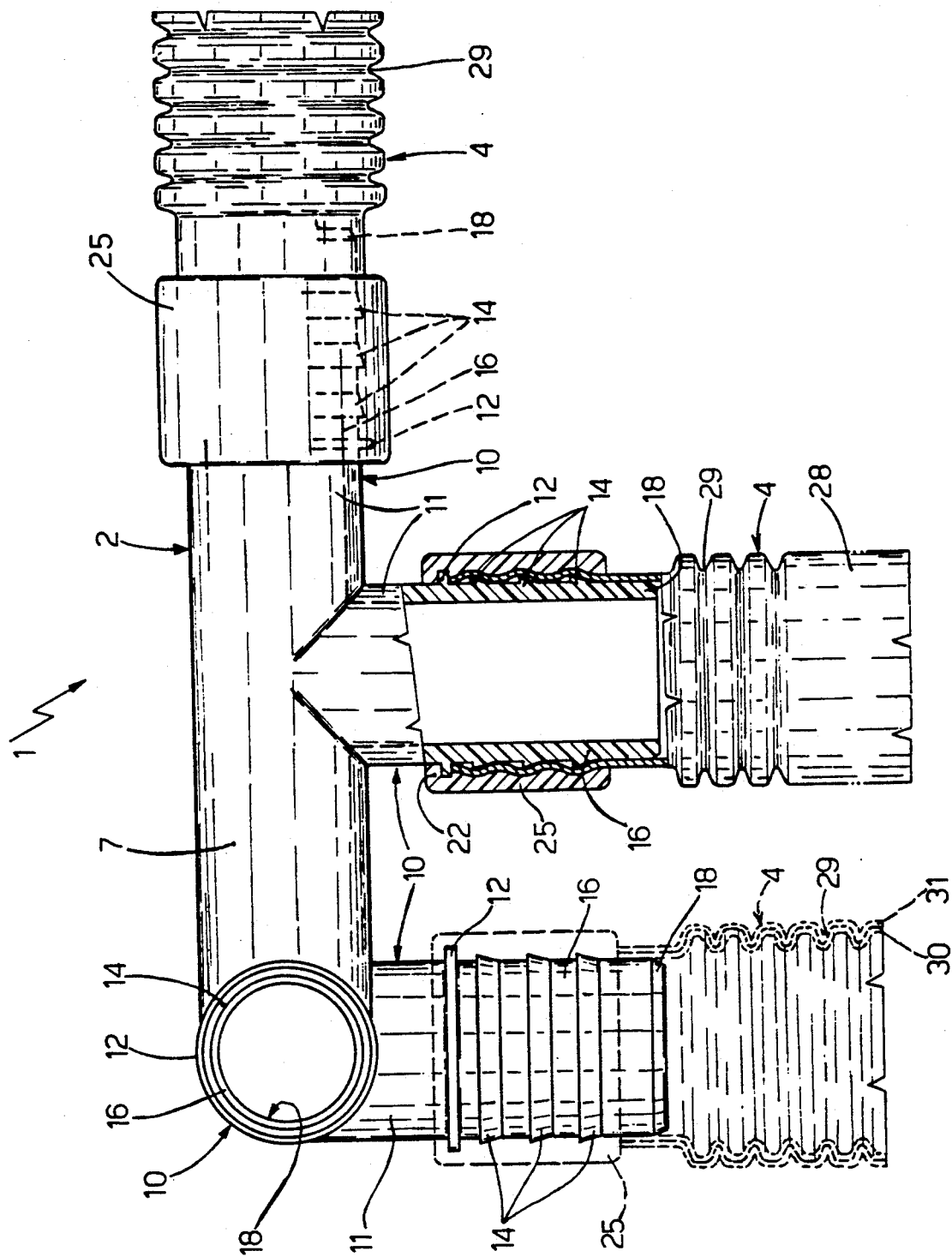

5,295,719

CONNECTION ASSEMBLY FOR VEHICLE ENGINE COOLANT CIRCUITS

This is a continuation of copending application(s) Ser. No. 07/712,149 filed on Jun. 6, 1991.

BACKGROUND OF THE INVENTION

The present invention relates to a connection assembly or vehicle engine coolant circuits.

Known circuits of the aforementioned type usually feature rubber hoses, the end portions of which are connected firmly to connecting assembly branches of the cooling system by means of metal clamps.

Connections of the aforementioned type present several major drawbacks: eventual aging of the hoses results in a loss of elasticity, in turn accompanied by a variation in the hose section, and in cracking so that the pressure exerted by the clamp is no longer sufficient for ensuring fluidtight sealing between the hose and the distributing element.

The presence of acid vapors, combined with the high temperature inside the engine compartment of the vehicle, results in corrosion and possible damage of the clamps, thus further impairing sealing performance.

SUMMARY OF THE INVENTION

It is an object of the present invention to provide a connection assembly to overcome the above drawbacks typically associated with known assemblies. Further aims and advantages of the present invention will be disclosed in the following description.

According to the present invention, there is provided a connection assembly for vehicle engine coolant circuits, comprising a tubular, multiway distributing element and at least one branch pipe connected to said distributing element; characterized by the fact that said branch pipe is secured to said distributing element by means of an element molded in one piece with a relatively small connecting portion between said branch pipe and said distributing element.

BRIEF DESCRIPTION OF THE DRAWING

The present invention will be described with reference to the accompanying drawing showing a partially-sectioned side view of a connection assembly for vehicle engine coolant circuits, according to the teachings of the present invention.

DETAILED DESCRIPTION OF THE INVENTION

FIG. 1 shows an overall view of the connection assembly according to the present invention, which comprises a four-way distributing element 2 conveniently made of plastic, e.g. acetal resin, connected, in FIG. 1, to three branch (two shown by a continuous and dotted line respectively, end one partially sectioned) connected at the other end to respective component parts of the coolant circuit, e.g. The engine, main radiator, passenger compartment radiator, circulating pump, etc. At the other end, said pipes 4 may also present snap-on connecting elements of the type described in Italian Patent Application "Connection assembly for vehicle engine coolant circuits" filed concurrently by the present Applicant.

Distributing element 2 comprises a central tubular body 7 from which extend four tubular appendixes 10, each having a first portion 11 consisting of a cylindrical lateral wall, at the end of which there extends outwards an annular flange 12, the function of which will be described later on.

Each appendix 10 also presents three annular, truncated-cone-shaped projections 14 spaced along the end portion 16 of appendix 10, between annular range 12 and end edge 18 of appendix 10, and increasing in section towards flange 12.

Pipes 4 present an inside diameter substantially equal to the outside diameter of appendixes 10, and are fitted on to end portions 16 so that the front end edges of pipes 4 contact flanges 12.

Pipes 4 are connected stably to appendixes 10 by means of a tubular coupling 25 made of plastic, molded in one piece on the portion of pipe 4 fitted to end portion 16, and securing pipe 4 to annular projections 14. Tubular coupling 25 presents an end portion 22 molded in one piece on a short portion of the exposed of appendix 10, beyond annular flange 12, for preventing coupling 25 from sliding in relation to appendix 10 and withdrawal of pipe 4.

Pipes 4 conveniently present a number of continuous smooth portions 28 and undulated portions 29 forming respectively rigid and flexible portions, for conveniently routing the coolant circuit between the various components inside the engine compartment.

Pipes 4 may be single-walled types, conveniently made of plastic (as shown), or comprise a first inner wall 30 and a second outer wall 31 (shown by the dotted line) integral with each other and made of different materials, e.g. polyethylene and nylon respectively.

From the foregoing description, the connection assembly according to the present invention clearly provides for overcoming the drawbacks associated with known assemblies. Coupling 25, in fact, despite covering a relatively short portion of distributing element 2, presses On a relatively long end portion of pipe 4, thus providing for excellent sealing between tubular appendixes 10 and branch pipes 4. What is more, being made of plastic, it is no longer subject to wear and corrosion typical of the metal clamps employed on known connection assemblies. Finally, connection time for assembling the coolant circuit on the vehicle is obviously reduced.

To those skilled in the art it will be clear that changes may be made to the connection assembly as described and illustrated herein without, however, departing from the scope of the present invention.

I claim:

1. A connection assembly for a vehicle cooling system, comprising:
   a distributing element with at least one tubular portion extending from said distributing element;
   a branch pipe positioned or said tubular portion and means for securing said branch pipe to said tubular portion;
   said securing means comprising a one-piece connecting element molded over said branch pipe and said tubular portion to form sealed one-piece unit;
   said tubular portion having a radially-outwardly extending annular flange and a plurality of truncated cone-shaped projections extending radially-outwardly from said tubular portion, and
   said connecting element having a cylindrical portion engaging said branch pipe over said annular flange and said cone-shaped projections to urge said branch pipe into sealing engagement with said tubular portion and said cylindrical portion having an internal recess terminating in an inwardly directed flange radially engaging said annular flange on one side and wall means radially engaging said annular flange on its other side to prevent said connecting element from sliding in relation to said tubular portion and said branch pipe.

2. The connection assembly as claimed in claim 1, characterized by the fact that said connecting element is made of plastic.

3. The connection assembly as claimed in claim 1, characterized by the fact that said branch pipe comprises a number of continuous smooth portions and undulated portions forming respectively rigid and flexible portions of said pipe.

4. The connection assembly as claimed in claim 1, characterized by the fact that said branch pipe comprises a first inner wall and a second outer wall integral with each other and made of different materials.

* * * * *

UNITED STATES PATENT AND TRADEMARK OFFICE
CERTIFICATE OF CORRECTION

PATENT NO.  : 5,295,719
DATED       : March 22, 1994
INVENTOR(S) : Dal Palu'

It is certified that error appears in the above-identified patent and that said Letters Patent is hereby corrected as shown below:

Column 1, line 29, after assembly insert --designed--

Column 1, line 56, after branch insert --pipes 4--

Column 1, line 63, after Application insert --entitled--

Column 2, line 6, delete "range" and insert --flange--

Column 2, line 18, after exposed insert -- part 11--

Signed and Sealed this

Twenty-sixth Day of July, 1994

Attest:

BRUCE LEHMAN

*Attesting Officer*    *Commissioner of Patents and Trademarks*